United States Patent [19]
Kluch

[11] Patent Number: 4,490,776
[45] Date of Patent: Dec. 25, 1984

[54] COLLAPSIBLE RIGID LIGHT BOX

[76] Inventor: Michael M. Kluch, 2230 E. Crary St., Pasadena, Calif. 91104

[21] Appl. No.: 493,012

[22] Filed: May 9, 1983

[51] Int. Cl.³ .......................................... G03B 15/02
[52] U.S. Cl. ...................................... 362/16; 362/18; 362/307; 362/310; 362/311; 362/319; 362/320; 362/352; 362/355; 362/360; 362/450
[58] Field of Search ................... 362/16, 18, 307, 310, 362/311, 319, 320, 352, 355, 360, 450

[56] References Cited

U.S. PATENT DOCUMENTS 4,052,607 10/1977 Larson .................................. 362/18
4,075,972 2/1978 Higuchi .......................... 362/16 X
4,146,918 3/1979 Tureck ................................. 362/16

Primary Examiner—Stephen J. Lechert, Jr.
Attorney, Agent, or Firm—Christie, Parker & Hale

[57] ABSTRACT

A rigid, collapsible light box is disclosed. The light box comprises a back panel having an opening in which a light unit can be mounted, a rear side panel hingedly connected to each side edge of the back panel and a front side panel hingedly connected to each rear side panel. A light diffuser panel is hingedly coupled to the front side panels. The light box is collapsible to a stacked two-layer structure wherein the back panel and rear side panels form one layer and the front side panels and the light diffuser panel form the other layer.

25 Claims, 16 Drawing Figures

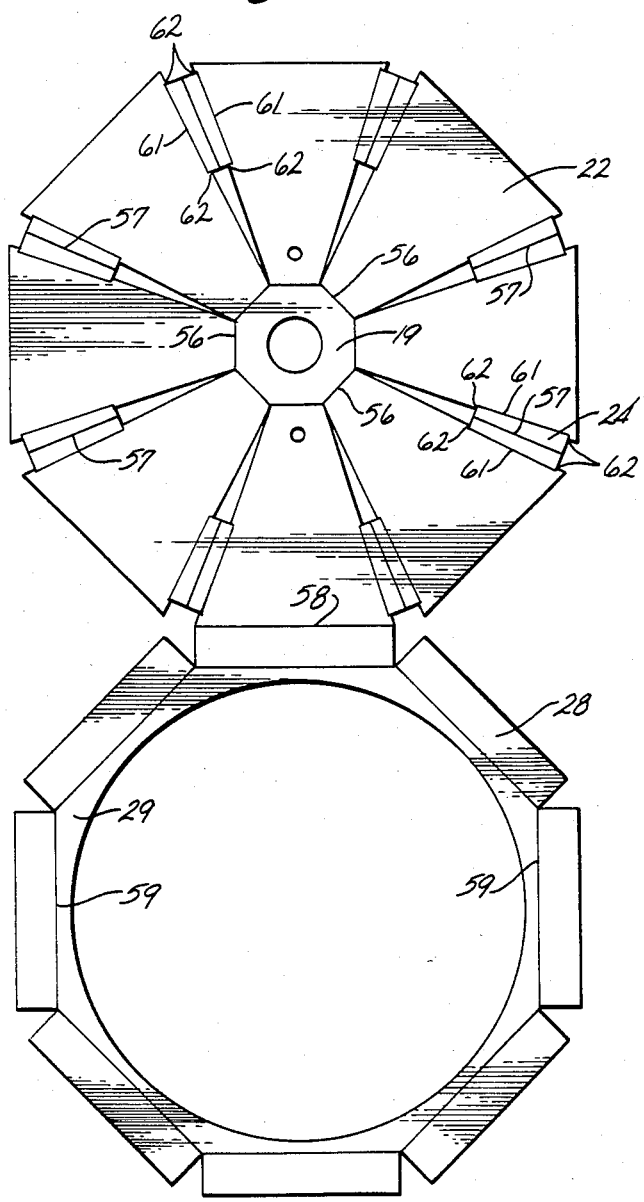

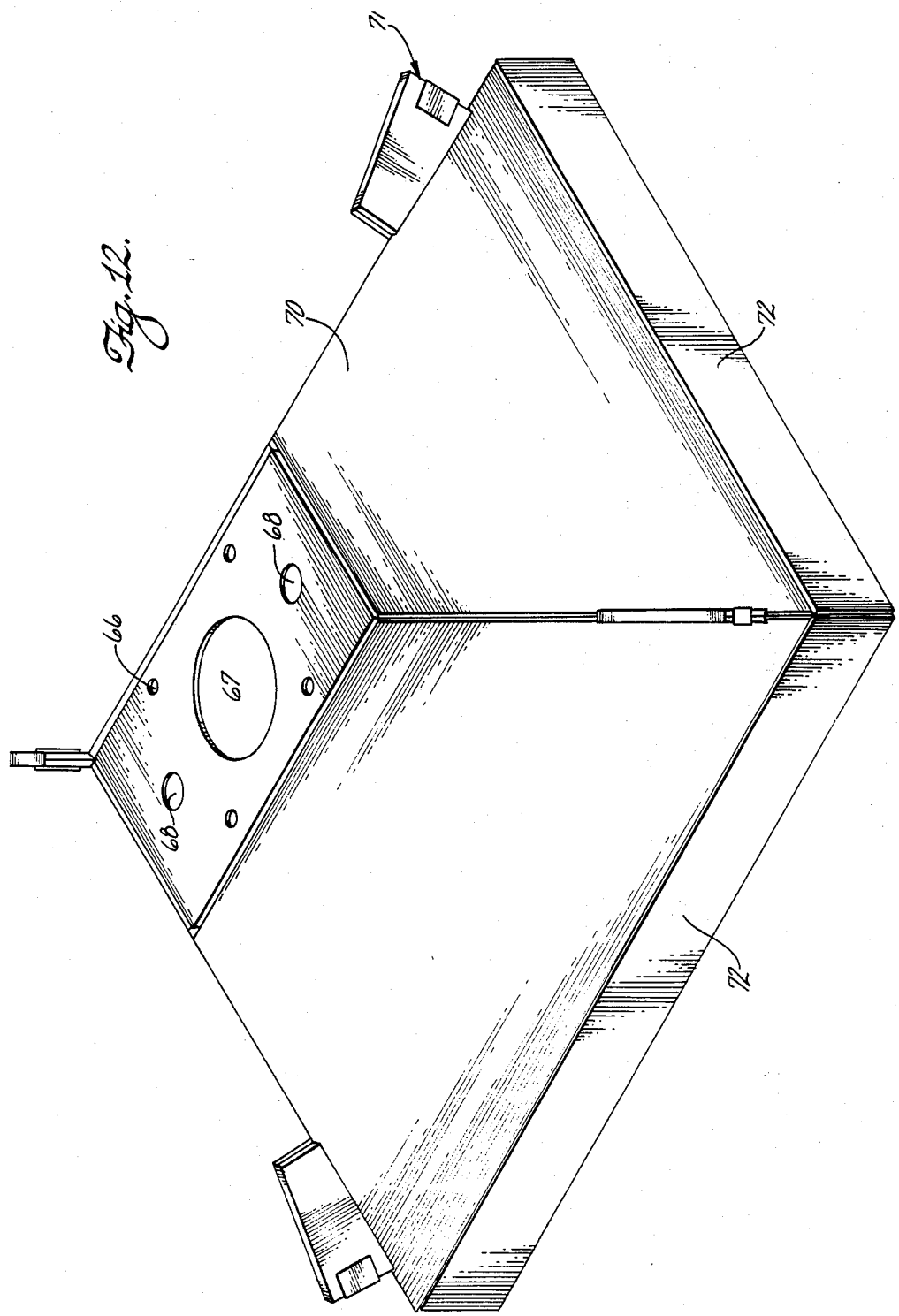

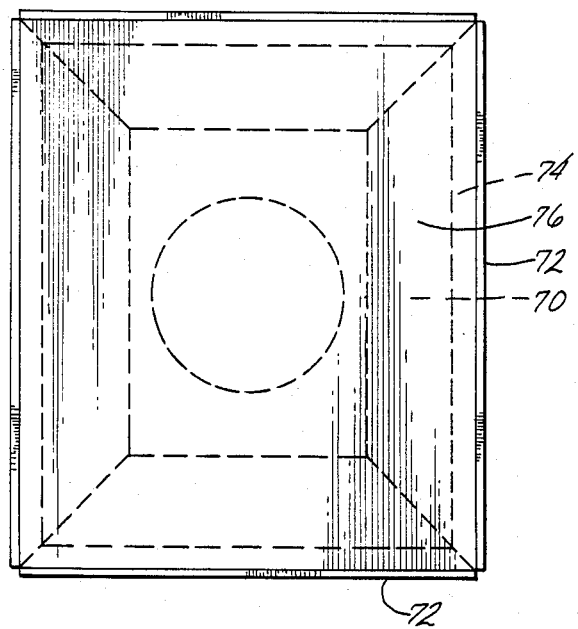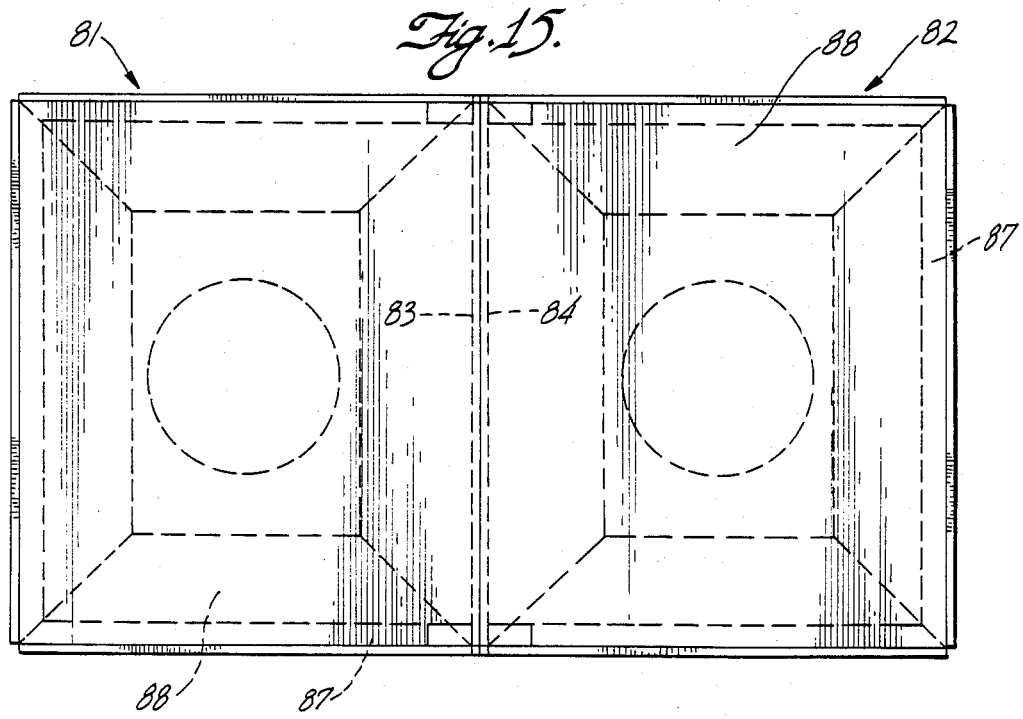

COLLAPSIBLE RIGID LIGHT BOX

FIELD OF THE INVENTION

This invention relates to light boxes and, more particularly, to a rigid light box which is collapsible for easy transport and storage.

BACKGROUND OF THE INVENTION

Light boxes are used in photography with both strobe and continuous light sources to provide even illumination of a subject. Such light boxes normally comprise a reflecting surface which distributes and directs the light from the source through a light diffuser panel to produce such even illumination.

There are generally two types of light boxes; fabric-type light boxes which are collapsible and rigid-type light boxes which are not. Fabric-type light boxes typically comprise a system of hoops and bars which are assembled into a frame. A fabric diffuser screen is stretched over the front of the frame while side and back panels of fabric extend around the remainder of the frame. The lamp is disposed within the interior of the light box with the lamp fixture typically extending through the back fabric panel.

There are various disadvantages to using such fabric-type light boxes. Some fabric-type boxes have a "dead" spot in the center of the diffuser panel. Others have a "hot" spot. Many of the fabric-type light boxes are unable to hold and maintain uniform and straight edges and/or uniform and straight side and back panels. All of these characteristics tend to result in uneven illumination on the subject.

Other problems with fabric-type light boxes are that they require assembly of frame members and the fabric covering the assembled frame. Such assembly is generally very time-consuming. Further, in such assembly and disassembly, the frame members can be broken or bent, resulting in inoperativeness or, at a minimum, very uneven geometry of the light box which results in uneven illumination.

Some of the aforementioned problems are overcome by fabric-type light boxes which incorporate a rigid light diffuser panel made of plastic; for example, Plexiglas. However, such fabric-type light boxes tend to be very expensive.

Rigid-type light boxes are generally made out of aluminum or a rigid plastic material such as fiberglass and have a rigid plastic light diffuser panel. Such light boxes have more uniform and even dimensions and tend to produce more evenly distributed and directed light than fabric-type light boxes.

However, the rigid-type light boxes are not collapsible and are substantially heavier than fabric-type light boxes. Since they are not collapsible such rigid-type light boxes are normally quite bulky and are, therefore, not easily transportable from one location to another. The weight of such rigid-type light boxes also mitigates against their transportability. Further, such rigid-type light boxes take up studio space when not in use. Being of heavier construction than fabric-type boxes, using more costly materials and requiring considerably more labor in their fabrication, such rigid light boxes also are quite costly and even more expensive than their fabric counterparts.

SUMMARY OF THE INVENTION

This invention provides a rigid light box which is collapsible for easy storage and transport. The light box comprises a generally flat back panel having a select number of generally straight side edges. The back panel comprises an opening in which a light unit can be mounted.

A generally flat trapezoidal rear side panel is hingedly connected to each side edge of the back panel. The rear side panels extend away from the back panel with adjacent rear side panels in edge-to-edge engagement.

The light box further comprises generally flat, rectangular front side panels connected to the edge of each rear side panel which is remote form the back panel. Adjacent front side panels extend from the rear side panels in edge-to-edge engagement.

The light box further comprises means for releasably maintaining adjacent rear side panels and front side panels in such edge-to-edge engagement. Preferred means comprises expandable, multiple hinged corner connectors, which connect each pair of adjacent rear side panels or adjacent front side panels. Each corner connector has two corner connector panels in face-to-face engagement which are hingedly connected to one of the adjacent rear or front side panels along one side edge and is hingedly connected to each other along the opposite side edge. The corner connector panels are maintained in face-to-face engagement by a clip.

There is further provided means for mounting the light fixture to the back panel so that the lamp of the light unit is disposed within the light box. Preferred means include a mounting plate having a base plate which is removably attached to the back panel and a holder which is fixedly attachable to the light unit and rotatably mountable on the base plate.

The light box further comprises a light diffuser panel which is hingedly coupled to the edge of each front side panel which is remote from the rear side panel. Preferred means for hingedly coupling the light diffuser panel to the front side panels comprises a front flange which is hingedly connected to the edge of each front panel which is remote from the rear side panel. The light diffuser panel is fixedly attached about its outer perimeter to the front flanges.

The light box is collapsible to a generally stacked, two layered structure wherein the rear side panel, the back panel and the means for mounting the light unit to the back panel form one layer and the front side panel and the light diffuser panel form the second layer which is in face-to-face engagement with the first layer.

BRIEF DESCRIPTION OF THE DRAWINGS

These and other features and advantages of the present invention will be better understood by reference to the following detailed description when considered in conjunction with the accompanying drawings wherein:

FIG. 11 is a top view of a flat sheet of laminate cut for fabrication into a light housing;

FIG. 12 is a perspective view of another preferred light box shown without the mounting plate;

FIG. 13 is a bottom view of the light box of FIG. 12;

FIG. 14 is a cross-sectional view of a multi-compartment light box;

FIG. 15 is a bottom view of the light box shown in FIG. 14;

DETAILED DESCRIPTION

Figure 1:
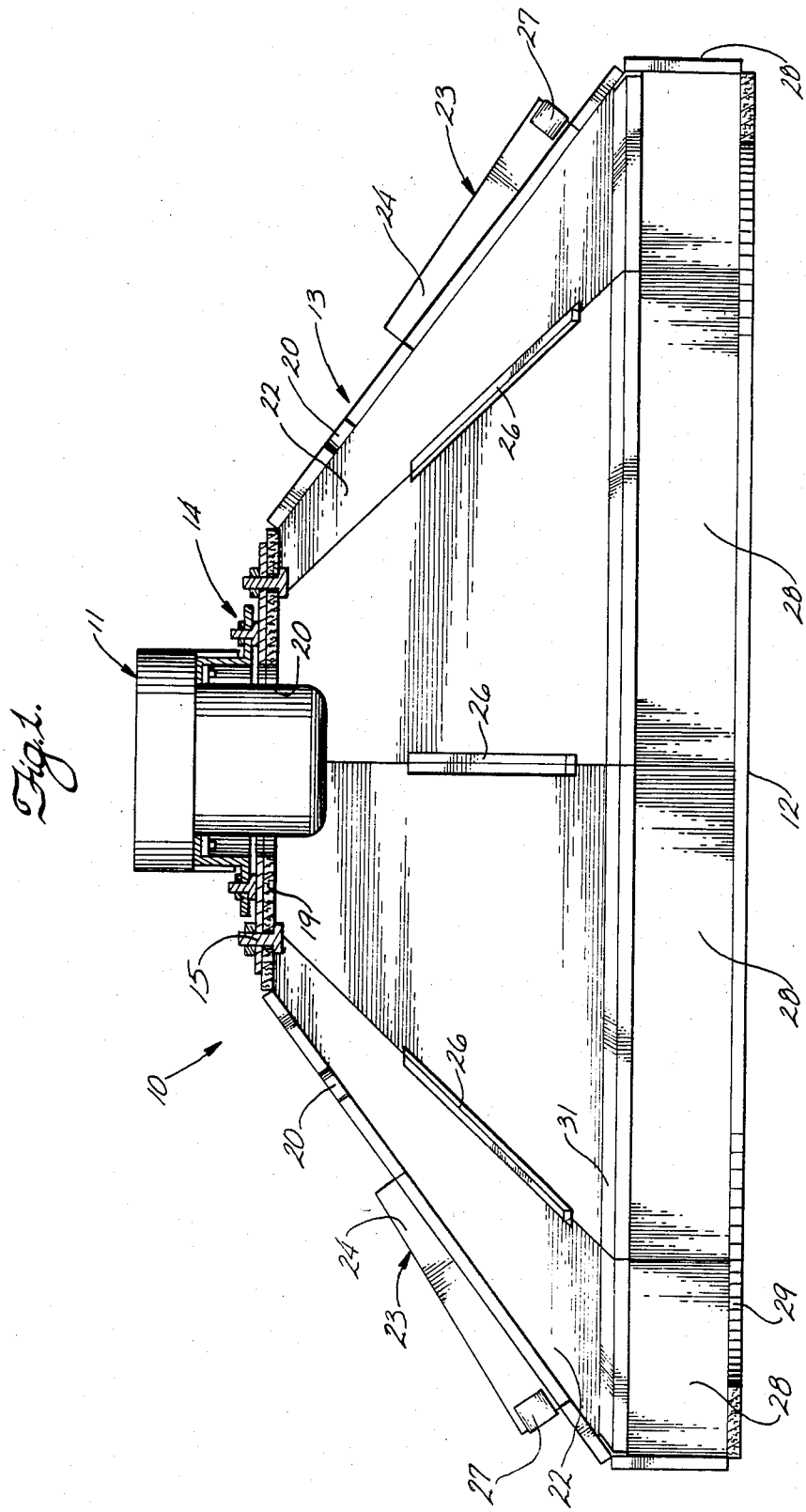
FIG. 1 is a cross-sectional view of a preferred light box with a light unit mounted on the light box.
Figure 2:
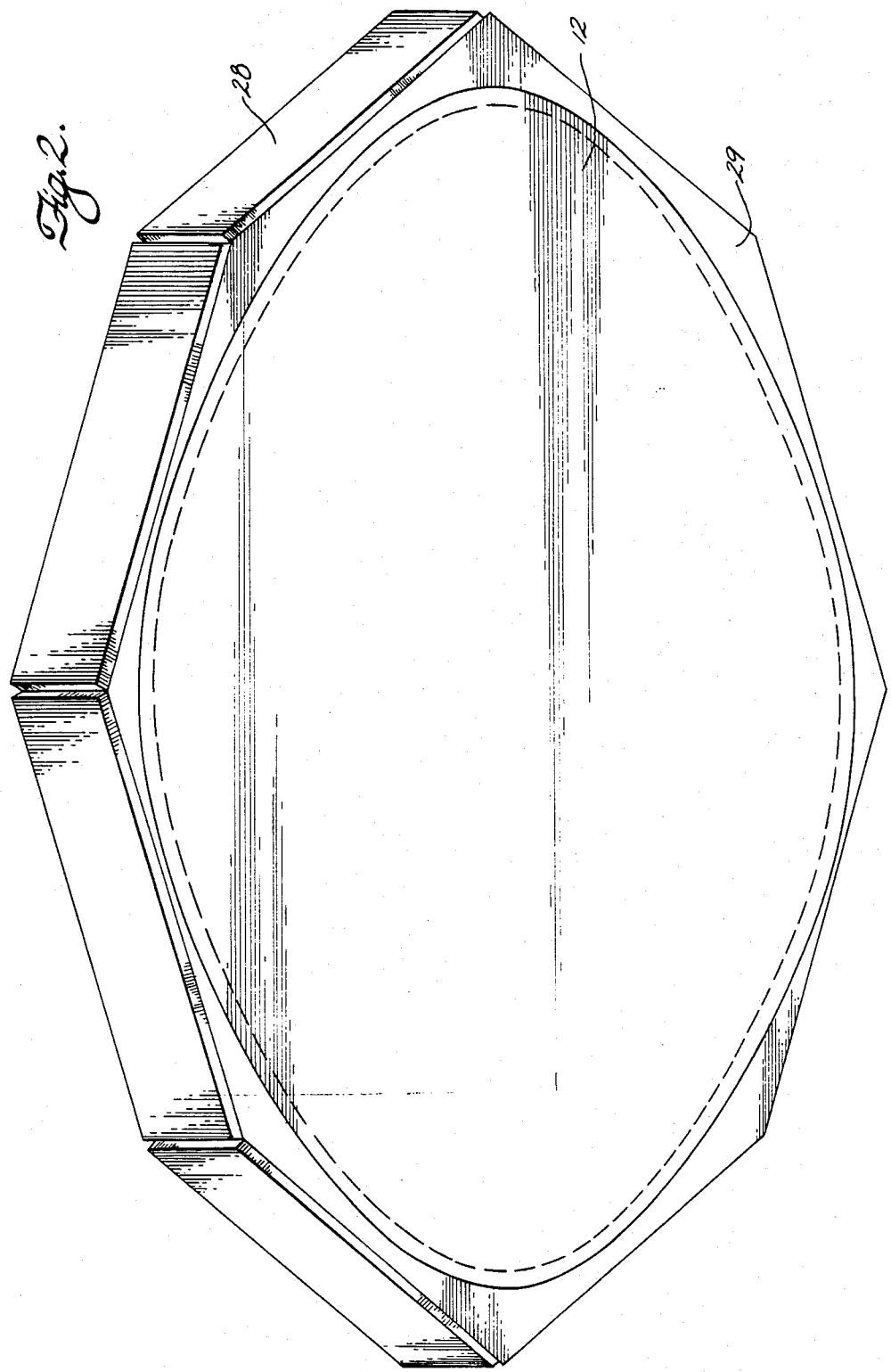
FIG. 2 is a perspective view of the light box of FIG. 1 showing the circular light diffuser panel.

With reference to FIGS. 1 and 2, there is shown a preferred assembled light box 10 with a strobe light unit attached. The light box 10 comprises a diffuser panel 12, a generally octagonal, pyramidal light housing 13, and a mounting plate 14 for mounting the light box on the strobe light unit. The light box is collapsible to a generally flat, easily transported and stored configuration due to its unique method of construction as will be more fully described.

Figure 3:
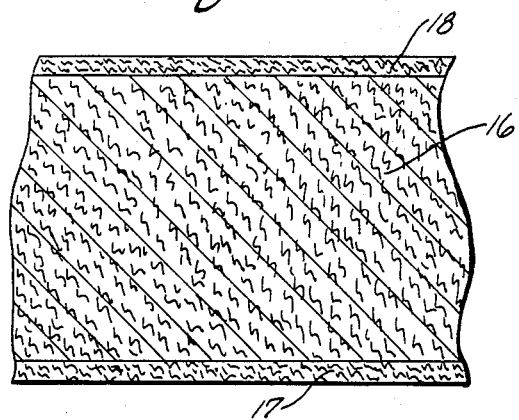
FIG. 3 is an enlarged fragmentary cross-sectional view of the laminate material from which the light box of FIGS. 1 and 2 is constructed.

The collapsible light housing is constructed out of a single, rigid, generally flat sheet of a lightweight laminated material which is die cut to provide a plurality of hinged panels defining the light box. The presently preferred laminate for use with such strobe light unit, shown in FIG. 3, has a generally rigid foam core 16 which is covered on each side by thin inner and outer flexible sheaths 17 and 18, respectively, which provide the inner and outer surfaces of the light housing. The inner sheath 17 of such laminate is preferably white for reflecting light from the strobe light unit. The outer sheath is preferably black to hold the light within the box. Such laminates are readily commercially available.

The collapsible light housing 13 comprises a generally horizontal flat octogonal back panel 19 (as shown in the orientation in FIG. 1) having eight generally straight side edges of equal length and a generally circular opening 21 through which the strobe light unit extends. The back panel further comprises four bolt holes 15 which are used for mounting the mounting plate 14 to the back panel.

The light housing 13 further comprises eight generally flat, trapezoidal rear side panels 22, each having generally straight, horizontal top and bottom edges and generally straight side edges. The length of the top edge of each rear side panel 22 is generally equal to the length of one side edge of the back panel 19. The rear side panels 22 are hingedly connected along their top edges to the side edges of the back panel 19. The rear side panels 22 extend downwardly and outwardly from the back panel 19 with adjoining rear side panels in edge-to-edge engagement. The hinged connection is obtained by die cutting the laminate through the outer sheath 18 and the foam core 16 but not through the inner sheath 17.

Figure 4:
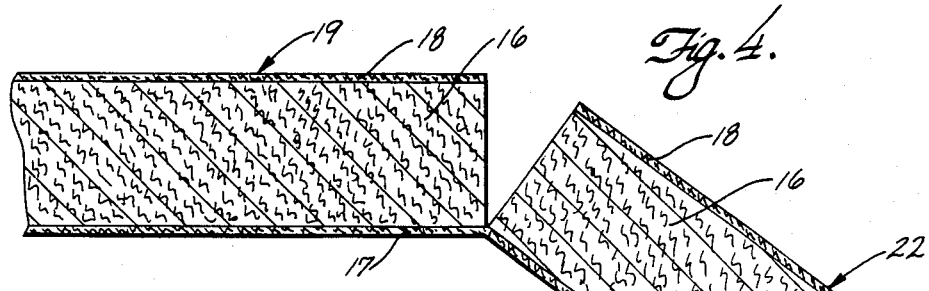
FIG. 4 is an enlarged fragmentary cross-sectional view of the hinged connection between the back panel and a rear side panel.

As shown in FIG. 4, the rear side panels 22 are hingedly connected to the back panel 19 by the inner sheath 17 of the laminate which is continuous across the interior side of the back panel 19 and the rear side panels 22. Because the inner sheath 17 is flexible, it acts as a hinge at the juncture of the side edges of the back panel 19 and the top edge of the rear side panels 22. The inner sheath 17 allows the rear side panels 22 movement relative to the back panel 19 from a position wherein the back panel 19 and rear side panels 22 are generally in the same plane in edge-to-edge abutment to a position where adjacent panels are in edge-to-edge engagement.

Two of the rear side panels have ventilation holes 20 to dissipate heat within the interior of the light box created by operation of the strobe.

Figure 5:
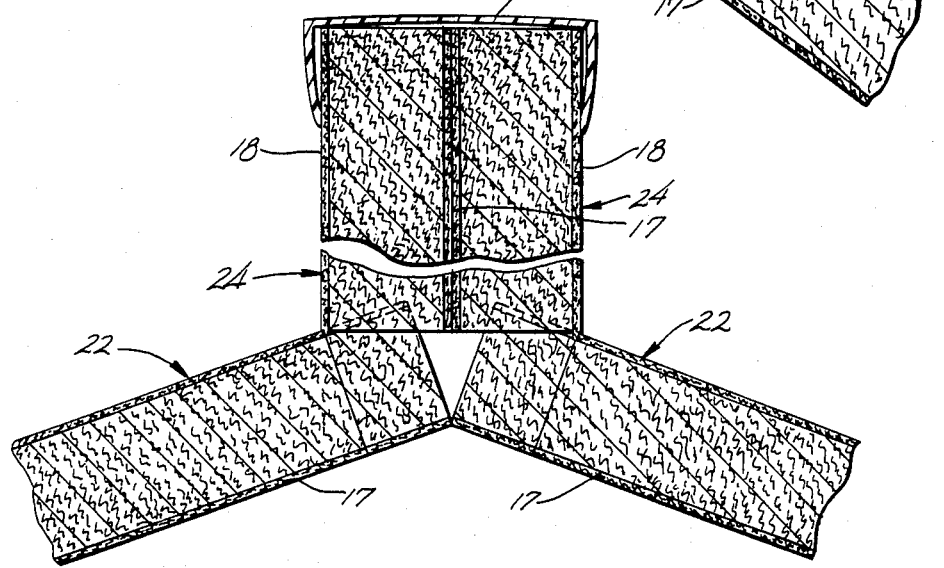
FIG. 5 is an enlarged fragmentary cross-sectional view of a corner connector and adjacent side panels.
Figure 6:
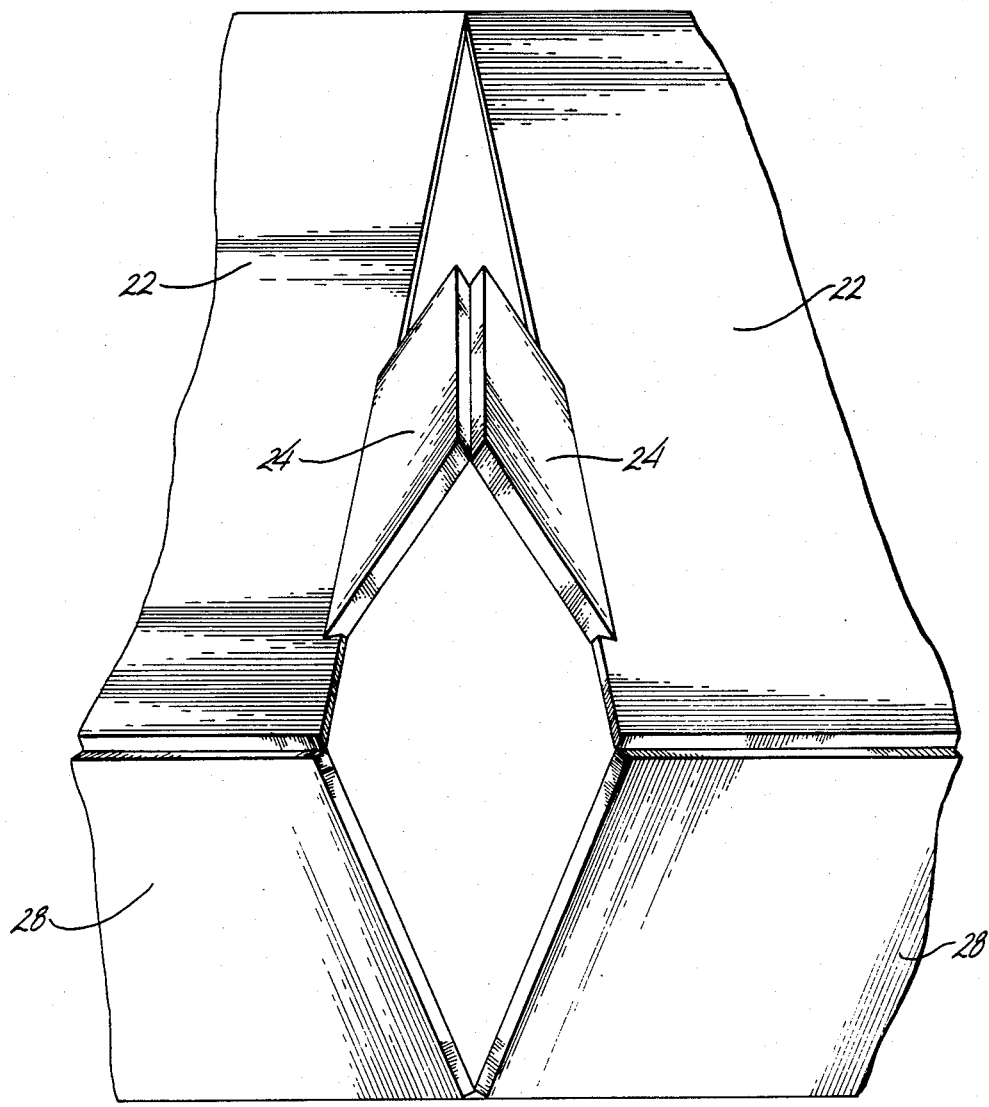
FIG. 6 is a fragmentary perspective view of a corner connector and adjacent side panels in a partially collapsed arrangement.

With reference to FIGS. 5 and 6, adjoining rear side panels 22 are connected and maintained in edge-to-edge engagement by multiple-hinged corner connectors 23. The corner connectors 23 comprise two generally vertical corner connector panels 24 in face-to-face engagement. The corner connector panels 24 are made of the same laminate as the back panel 19 and rear side panels 22.

The corner connector panels 24 are hingedly connected to each other at their upper edges by the inner flexible sheath 17 of the laminate which lines the inner surface of each corner connector panel 24, i.e., the surface of each corner connector panel adjacent the other corner connector panel. The inner flexible sheath 17 is continuous over the entire inner surface of both corner connector panels. As a result of the flexibility of the inner sheath 17, the corner connector panels 24 are afforded hinged movement relative to each other from the position wherein the corner connector panels are generally vertical and in face-to-face engagement to a position wherein the corner connector panels are in a flat edge-to-edge abutting arrangement.

The corner connector panels 24 are hingedly connected at their lower edges to separate rear side panels. Referring again to FIG. 1, each rear side panel 22 comprises a generally rectangular notch 26 at a selected position along the length of each side edge of the rear side panel 22 to accommodate the thickness of the corner connector panels 24. The notch 26 has a length about equal to the length of the lower edge of a corner connector panel 24 and a depth, i.e., the distance in which the notch extends into the rear side panel from the side edge, about equal to the thickness of a corner connector panel 24, i.e., equal to the thickness of the laminate.

Again with reference to FIGS. 5 and 6, the exterior corner of the lower edge of each corner connector panel 24, i.e., the corner remote from the other corner connector panel, is hingedly connected to the exterior corner, i.e., the corner remote from the interior of the light housing, of the edge of the rear side panel 22 which defines the length of the notch 26. In such an arrangement, the lower edge of the corner connector panel 24, except for the exterior corner, extends slightly into the corresponding notch 26 in the rear side panel. The notch 26 thereby enables the side edges of adjoining rear side panels to meet in an edge-to-edge arrangement, thereby minimizing light leakage from the light box between adjacent rear side panels when the light box is erected into its normal operating configuration.

The corner connector panels and rear side panels 22 are hingedly connected by the outer sheath 18 of the laminate which lines the exterior surface of the light housing 13. The outer sheath 18 is continuous over the rear side panel 22 and the adjoining corner connector panel 24. As a result of its flexibility, the outer sheath 18 provides hinged movement of the corner connector panels relative to the rear side panels from the position wherein the corner connector panel is generally vertical to a position wherein the corner connector panel is generally in the same plane as the adjoining rear side panel.

Figure 7:
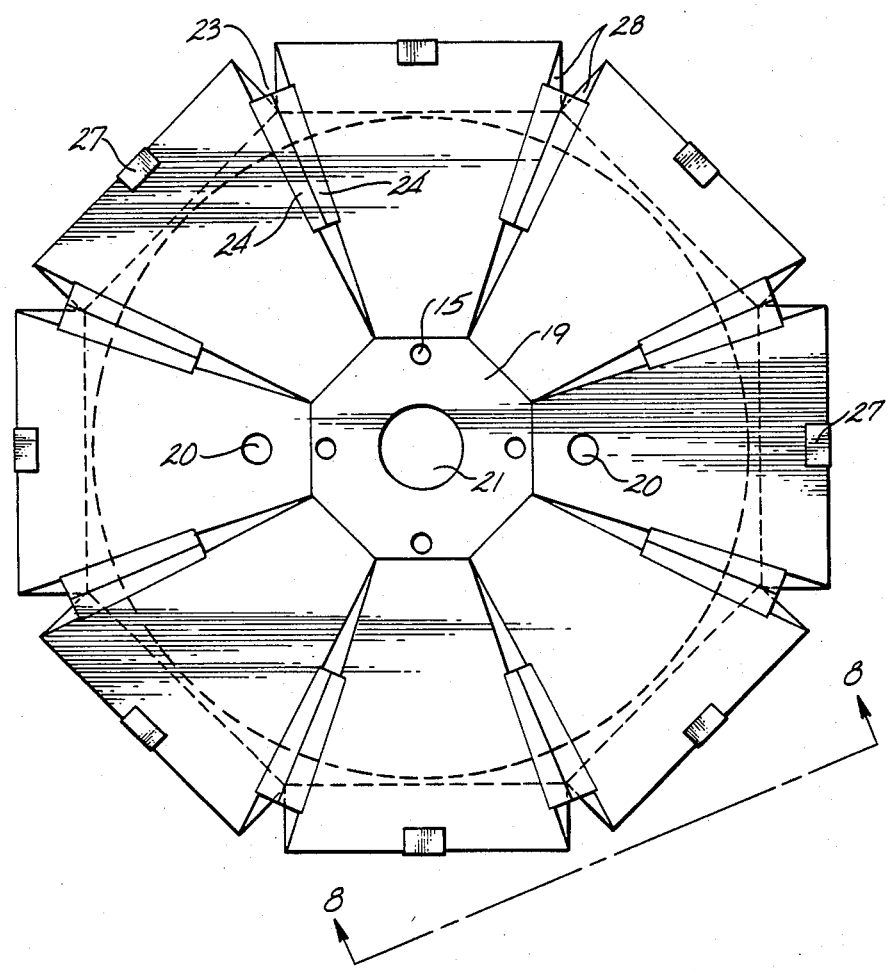
FIG. 7 is a top view of the light housing of the light box shown in FIGS. 1 and 2 in the collapsed arrangement.
Figure 8:
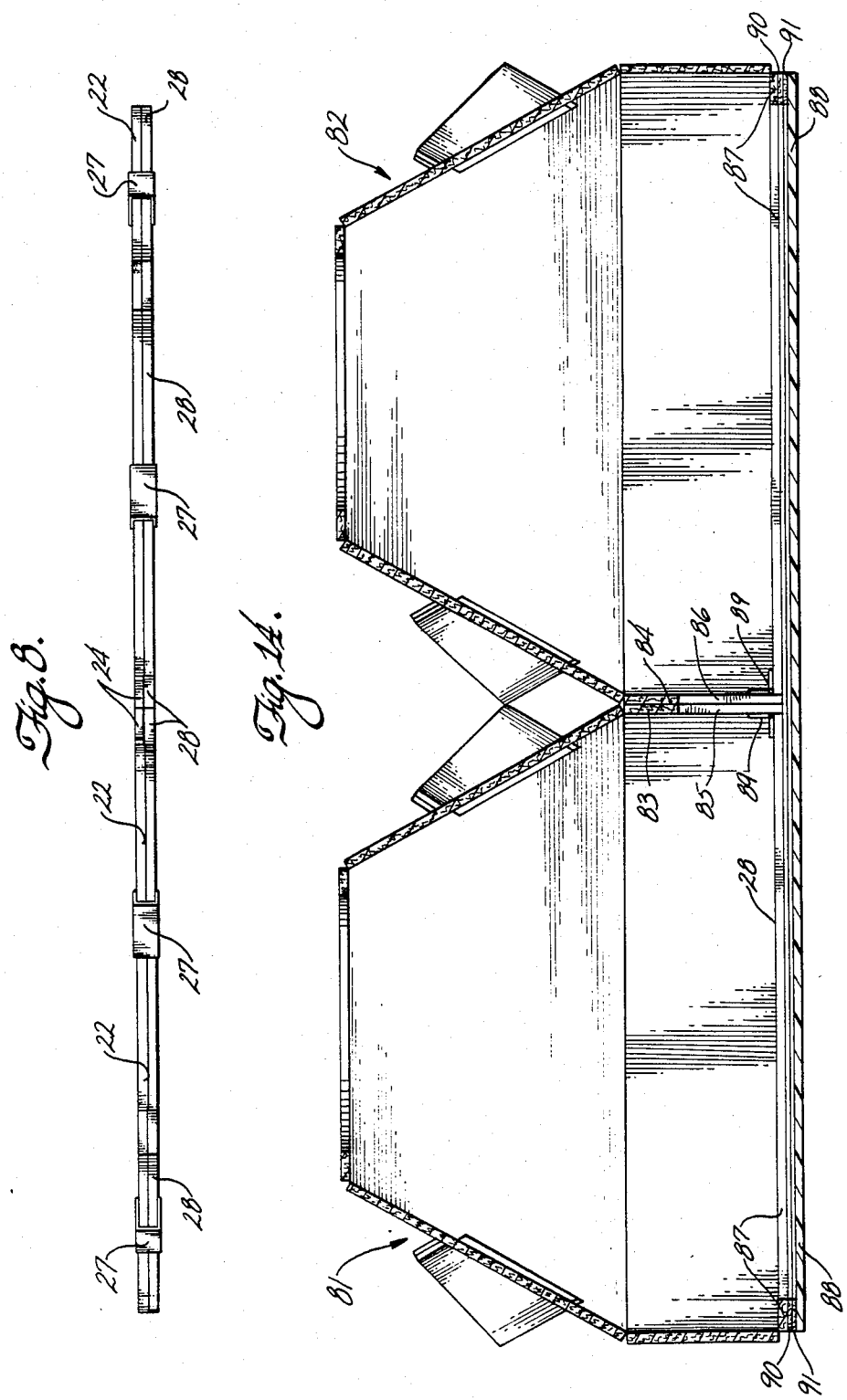
FIG. 8 is a side view of the light housing of the light box shown in FIGS. 1 and 2 in the collapsed arrangement.

With reference to FIGS. 7 and 8, the width of the corner connector panels 24, i.e., the vertical height of the corner connector panels when the light box is erected and oriented as shown in FIG. 1, is sufficient to enable the light housing to be collapsed to an arrangement wherein the back panel 19, rear side panels 22, and all corner connector panels 24 are generally in the same plane.

In such a collapsed arrangement, the upper corner, i.e., the corner formed by the side edge and the top edge, of each adjacent rear side panel and the corresponding corner formed by two side edges of the back panel meet at a single junction. As the side edges of the adjoining rear side panels extend away from such junction, the distance between the adjacent rear side panels increases, thereby forming a generally triangular-shaped gap between the adjacent rear side panels with the apex of the triangular gap being at the juncture.

The corner connector 23 bridges the gap between adjacent rear side panels, extending between the notches 26 in those rear side panels. The width of each corner connector panel 22 is, therefore, one-half the distance between the notches 26 in adjacent rear side panels when the light housing 13 is collapsed. The width is determined by the distance of the corner connector panel 24 or the notch 26 from the upper corner of the rear side panels.

The width of each corner connector panel 24 increases along the length of the corner connector panel from the end of the corner connector panel nearest the upper corner of the rear side panel to the end furthest from such upper corner.

When the light box is assembled, the corner connector panels 24 are maintained in face-to-face engagement by a generally C-shaped clip 27 which extends over the end or top edges of the corner connector panels and applies a force to the exterior surfaces of the corner connector panels.

Referring again to FIG. 1, the collapsible light housing further comprises eight generally vertical front side panels 28. Each front side panel 28 has generally horizontal top and bottom edges and generally vertical side edges. The front side panels have a length generally equal to the length of the bottom edge of a rear side panel 22 and are hingedly connected along their top edges to the bottom edge of the rear side panel.

The width of the front side panels, i.e., the vertical height of the front side panels when the light box is in the orientation shown in FIG. 1, is dependent on the length of the rear side panels and the angle of the rear side panels to the back panel and is selected to allow the light box to be collapsed into a generally flat, two-layered structure which is described in more detail subsequently.

One front side panel 28 is connected to a rear side panel 22 by the inner sheath 17 of the laminate. The inner sheath 17 is continuous over the interior surface of the rear side panel 22 and front side panel 28. The rear side panel is hingedly connected to the seven other lower side panels by flexible tape 31 which is applied to the interior surfaces of the rear side panels and the front side panel, thereby forming a continuous, flexible covering extending from the rear side panel to the front side panel.

Due to its flexibility, the inner sheath 17 and flexible tape 31 act as hinges which allow movement of the front side panels 28 relative to the rear side panels 22 from a position wherein the front side panels are generally vertical to a position wherein the front side panels and rear side panels are in face-to-face engagement.

The light housing further comprises a flat, annular, generally horizontal front panel 29 having a generally octagonal-shaped outer perimeter and a generally circular inner perimeter forming a large circular opening into the interior of the light housing. The length of each outer edge of the octagonal perimeter is about equal to the length of the bottom edge of a front side panel and the front panel 29 is hingedly connected along its outer edges to the bottom edges of the eight front side panels 28.

The front panel 29 is hingedly connected to the front side panels by the inner sheath 17 of the laminate which is continuous across the interior surface of the front panel and the front side panels.

The light box further comprises a light diffuser panel 12 fixedly mounted over the front panel 29 which covers the entire circular opening through the front panel. The presently preferred means for fixedly mounting the light diffuser panel to the front panel is double-stick tape. Such tape, applied between the front panel and light diffuser panel, forms a continuous seal around the perimeter of the light diffuser panel and prevents light leakage out of the front of the light box from gaps between the light diffuser panel and the front panel.

Commercially available light diffuser panels can be used. The presently preferred light diffuser panel is made by B and D Paper Co. and marketed under the trade name Translume.

The strobe light unit 11 is mounted in the light box by means of mounting plate 14. The mounting plate 14 generally varies in design according to the configuration of the strobe light unit which is used. The mounting plate allows the light box to be held stationary relative to the strobe light unit with at least the lamp of the strobe light unit disposed within the interior of the light box.

Figure 9:
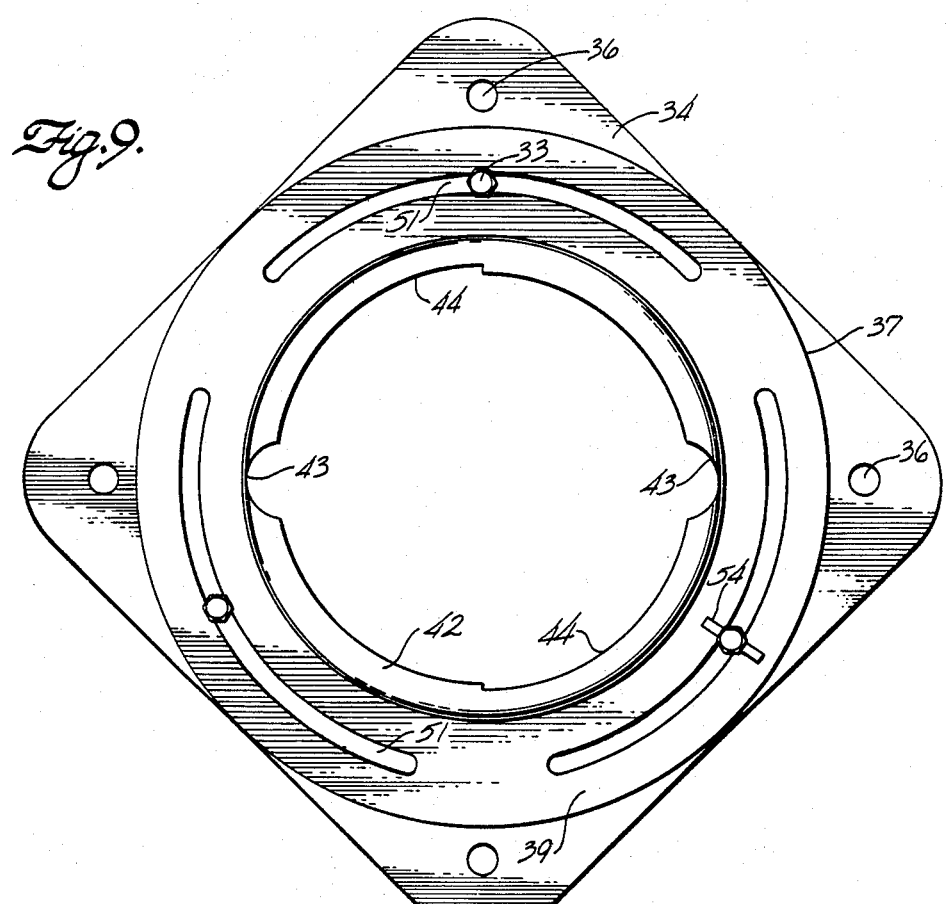
FIG. 9 is a top view of the mounting plate.
Figure 10:
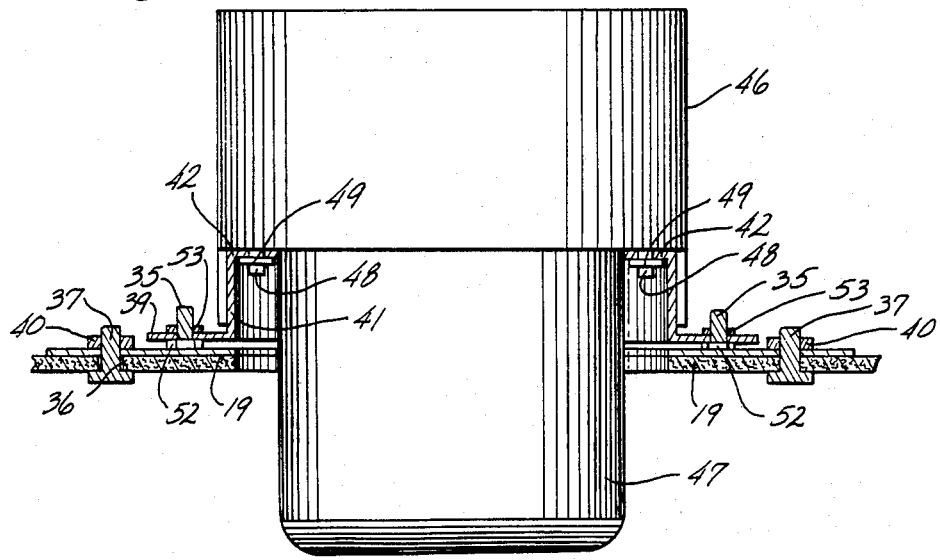
FIG. 10 is a cross-sectional side view of the mounting plate mounted on a strobe light unit.

A plate 14 for mounting a strobe light unit marketed by Speedotron Corp. of Chicago, Ill., to the light box is shown in FIGS. 9 and 10. The mounting plate 14 comprises a generally square, horizontal base plate 34 having bolt holes 36 in each corner and a large circular opening in its center. The base plate 34 is mounted on the back panel 19 of the light housing 13 with the bolt holes 36 in the base aligned with the bolt holes 15 in the back panel. Bolts 37 extend through bolt holes 15 and 36 in the back panel and base plate from the interior of the light housing and nuts 40 are threaded onto the shanks of the bolts to secure the base plate 34 to the back panel 19.

The base plate 34 further comprises three threaded studs 35 extending upwardly from the base plate. The studs 35 are positioned symmetrically around the circular opening in the center of the base plate.

A rotatable holder 38 is mounted to the base plate 34. The holder has a horizontal, annular base 39 and a generally cylindrical vertical side wall 41. A horizontal flange 42 extends inwardly from the top edge of the side wall 41. The flange 42 comprises a pair of semi-circular cut-outs 43 and a notch 44 extending from each cut-out 43 along the inner edge of the flange 42 a portion of the distance between the cut-outs 43.

The base 39 of the holder 38 has three spaced apart slots 51, each extending in an arc of about 90° around the base. The holder is mounted on the base plate with the studs 35 extending through separate slots 51. A nylon spacer 52 is positioned on each stud 35 between the base plate and the base of the holder. The nylon spacer 52 allows the holder to be rotated easily without creating an undesirable amount of friction between its base and the base plate.

A second nut 53 is threaded onto two of the studs to a position slightly above the base of the holder. The two nuts 53 are sufficiently loose to allow the holder to be rotated relative to the holder until the studs 35 reach the end of the slots 51. A wing nut 54 is provided on the third stud which can be tightened sufficiently to prevent such rotation. The wing nut 54 is easily tightened and loosened and allows the light box to be rotated relative to the strobe light and then secured in a new position quickly and easily.

The strobe light unit to which the above described holder is mounted comprises a generally cylindrical housing 46. The bulb 47 of the strobe extends out one end of the housing. Between the lamp 47 and the housing 46 of the strobe light unit are a pair of pins 48 on opposite sides of the lamp. Each pin has associated with it a stationary washer 49.

To attach the holder to the strobe light unit, the side wall 41 of the holder 38 is inserted in the space between the lamp 47 and the housing 46 and oriented so that the cut-outs 43 in the flange 42 are aligned with the pins 48 and washers 49 of the strobe light unit. The holder 38 is inserted into the housing 46 sufficiently that the flange 42 is past the washer 49. The holder is then twisted so that the pins 48 and washers 49 contact the notch 44 which prevents the holder 38 from moving relative to the strobe light.

The light box can be collapsed into a very compact, generally flat, stacked, two-layered structure. As shown in FIG. 6, the back panel 19, the rear side panels 22, and the corner connector panels 24 are generally in the same plane and form one layer of the structure. The front side panels 28 and the front panel 29 are in edge-to-edge abutment generally in the same plane and along with the light diffuser panel 32 which is fixedly attached to the bottom panel form the second layer of the structure, which is in face-to-face engagement with the first layer. To further reduce the thickness of the collapsed light box, the entire mounting plate 14 can be removed.

When the light box is collapsed, the rear side panels and the back panel are maintained in the generally flat arrangement by the corner connector panels which require a slight downward force to be applied to the corner connector panels to "snap" the corner connector panels into a position in an edge-to-edge abutting arrangement with each other and the adjacent rear side panels. To assemble the light box, a slight upward force on the corner connector is necessary to release the corner connector panels from such position.

Also, the clips 27 can be placed over the side edges of the collapsed light box, which correspond to the bottom edge of the rear side panel and the top edge of the front side panel when the light box is assembled, to maintain the light box in the collapsed position.

This invention offers the unique advantage that the light housing of such a light box can be constructed from a single flat sheet of the laminate. FIG. 11 shows the light housing in a single plane, cut from a single flat sheet of the laminate shown in FIG. 3.

To create the hinged connections between the back panel 19 and the rear side panels 22, the laminate is preferably die cut along lines 56 through the top or outer sheath and the foam core, leaving intact the bottom or inner sheath. To make the hinged connection between corner connector panels 24, the laminate is cut along lines 57 through the outer sheath and foam core, again leaving the inner sheath intact.

The laminate is cut along lines 58 and 59 in the same manner to create the hinged connection between the rear side panel 22 and the front side panel 28 and the hinged connections between the front side panels 28 and the front panel 29.

To generate the hinged connections between the corner connector panels 24 and the rear side panels 22, the laminate is cut through the inner sheath and foam core, leaving intact the outer sheath along lines 61 and the laminate is cut all the way through, i.e., inner sheath, core, and outer sheath, along lines 62.

Another preferred light housing is shown in FIGS. 10 and 11. Such a light housing has a generally rectangular back panel 66 having an opening 67 in which a strobe light can be mounted and two ventilation holes 68.

The light housing further comprises four rear side panels 69 hingedly connected to the back panel 66 and maintained in edge-to-edge engagement along their side edges by corner connectors 71 as previously described. There are four front side panels 72 hingedly connected to the rear side panels 69, also as previously described.

The light housing comprises four straight front flanges 74 which are rigidly attached to adjacent front flanges at their ends and form a border having rectangular inner and outer perimeters. Each front flange 74 is hingedly attached to the four front side panels 72.

The light diffuser panel 76 for such a light housing is generally rectangular and is mounted to the front flanges 74 in the same manner as previously described.

Another preferred embodiment of the invention is shown in FIGS. 14 and 15 and comprises a two-compartment light housing structure. Such a two-compartment light housing comprises first and second light housing units 81 and 82, e.g., generally as shown in FIGS. 12 and 13, hingedly connected to each other. The first and second light housing units are positioned so that a front side panel 83 of one housing is in face-to-face engagement with a front side panel 84 of the other.

The two adjacent front side panels 83 and 84 are hingedly connected along their bottom edges to each other. The adjoining front side panels 83 and 84 are shorter, i.e., have a smaller width, than the remaining front side panels of the two-compartment light housing. This provides an opening between the interiors of the light housing units. At each end of the front side panels 83 and 84, there are extensions 85 and 86 which extend down to the same level as the bottom edges of the other front side panels. This minimizes light leakage through a gap in each side of the two-compartment light box between the adjoining light housing units which would otherwise be formed.

A front flange 87 is hingedly connected to each of the front side panels which form the outer perimeter of the two-compartment light housing. The bottom edges of the extensions 85 and 86 are hingedly connected, e.g., by small hinge 89, to adjoining front flanges 87.

A first plastic fastening tape, e.g., a nylon tape closure manufactured by Velcro Corp. of New York and marketed under the trade name Velcro is attached to and extends around the front flange 87. A light diffuser panel 88 comprising a second plastic fastening tape 91 about its perimeter is releasably attached to the front flanges 87 by the first and second plastic fastening strips 90 and 91.

The light diffuser panel can be detached from the light housing. If a flexible light diffuser panel is used, such as that made by B and D Paper Co. and marketed under the name Translume, the light diffuser panel can be rolled up for easy storage.

The two-compartment light housing is collapsible to a stacked structure having four layers. The two outer layers comprise the back panels and rear side panels of the two light housings 81 and 82. The two inner layers comprise the front side panels.

The preceding description has been presented with reference to the preferred embodiments of the invention and orientation of those embodiments shown in the accompanying drawings. It is apparent that variations and changes in the described structures can be made without departing from the scope of the invention. For example, it is apparent that the light boxes can be used in other orientations as desired.

For example, the preferred material for fabricating the light housing is a laminated material having a rigid foam core covered by flexible sheaths. Such a laminate is preferred because it is durable, yet lightweight. Other laminates may also be used. However, a foam core laminate is only preferred for use with strobe lights which do not generate a great deal of heat. For a continuous lighting unit, the light housing is preferably fabricated from a more heat-resistant material such as a fiberglass resin or aluminum sheeting.

While the hinged connections described previously are presently preferred when using the described laminated material, it is apparent that other connecting means must be used when other materials are used. Conventional hinge connectors that are attachable to each panel which is to be connected are suitable. As described, a flexible tape which can be applied to the panels so that the tape extends across both panels can be used. Such tape provides the advantage that it minimizes the additional thickness of the light box caused by the hinge connector when collapsed.

Figure 16:
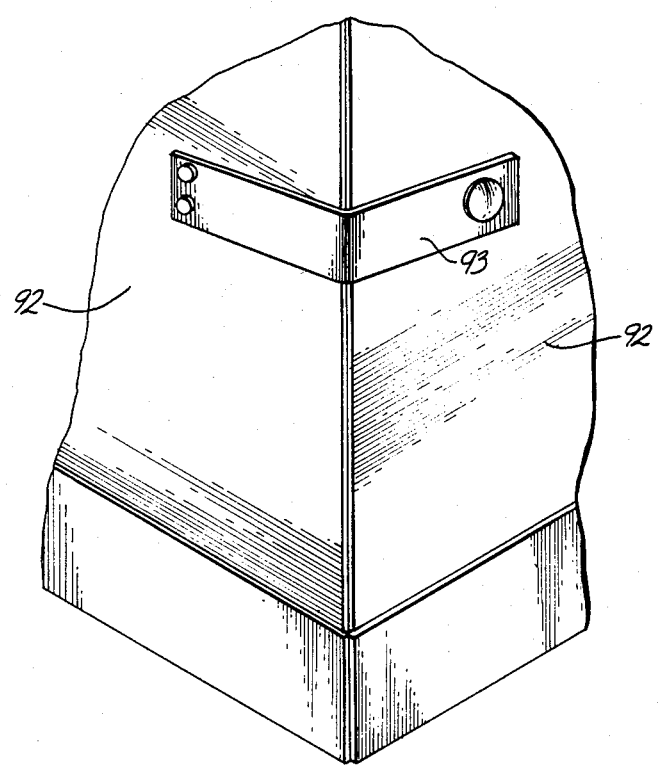
FIG. 16 is a fragmentary side view of adjacent rear side panels and a strap arrangement for maintaining the rear side panels in edge-to-edge engagement.

Other means for maintaining adjacent front and rear side panels in edge-to-edge engagement can be used. For example, rather than a corner connector and clip arrangement as previously described, the light box may comprise a releasable fastener system. As illustrative, FIG. 16 shows two adjoining rear side panels 92. To one rear side panel, the end of a short strap 93 is attached. The strap extends to a position on the other rear side panel where it is releasably attached; for example, by a snap, plastic fastening tape, or the like.

It is also apparent that any appropriate means for mounting the light unit to the light box can be used. Such mounting means will vary according to the particular light unit which is used due to the various sizes and configurations of available light units.

While two or more light units can be mounted in light boxes having multiple light housing units such as that previously described, multiple light units can also be mounted in light boxes having a single light housing unit, providing the back panel of such housing unit is sufficiently large to accommodate the light units.

What is claimed is:

1. A rigid collapsible light box comprising:
 a rigid back panel having a select number of side edges and an opening in which a light unit having a lamp can be mounted;
 a rigid rear side panel hingedly connected to each side edge of the back panel;
 a rigid front side panel hingedly connected to each rear side panel;
 a light diffuser panel hingedly coupled to the front side panels;
 means for mounting the light unit to the back panel with the lamp disposed within the interior of the light box; and
 wherein the light box is collapsible to a generally stacked, two-layered structure wherein the first layer comprises the back panel, rear side panels, and means for mounting the lighting unit to the back panel and the second layer comprises the front side panels and the light diffuser panel.

2. A rigid, collapsible light box as claimed in claim 1 wherein rear side panels connected to adjacent side edges of the back panel extend from the back panel in edge-to-edge engagement.

3. A rigid, collapsible light box as claimed in claim 2 wherein front side panels connected to adjacent rear side panels extend from the rear side panels in edge-to-edge engagement.

4. A rigid, collapsible light box as claimed in claim 3 means for releasably maintaining adjacent rear side panels and front side panels in edge-to-edge engagement.

5. A rigid, collapsible light box as claimed in claim 1 wherein housing structure is fabricated from a single integral piece of material.

6. A rigid, collapsible light box comprising:
 a generally rigid flat back panel having a select number of generally straight side edges and an opening in which a light unit having a lamp can be mounted;
 a generally rigid flat, trapezoidal rear side panel hingedly connected to each side edge of the back panel, wherein rear side panels connected to adjacent side edges of the back panel extend from the back panel in edge-to-edge engagement;
 a generally rigid flat, rectangular front side panel hingedly connected to the edge of each rear side panel remote from the back panel, wherein front side panels connected to adjacent rear side panels extend from the rear side panels in edge-to-edge engagement;
 means for releasably maintaining adjacent rear side panels and front side panels in edge-to-edge engagement;
 a light diffuser panel;
 means for hingedly connecting the light diffuser panel to the edge of each front side panel remote from the rear side panel;

means for mounting the light unit to the back panel with the lamp disposed within the interior of the light box; and wherein the light box is collapsible to a generally stacked, two-layered structure wherein the first layer comprises the back panel, rear side panels, and means for mounting the lighting unit to the back panel and the second layer comprises the front side panels and the light diffuser panel.

7. A rigid, collapsible light box as claimed in claim 6 wherein the means for releasably maintaining adjacent rear side panels and front side panels in edge-to-edge engagement comprises:

a corner connector comprising a pair of corner connector panels each hingedly connected to a separate rear side panel or front side panel along one side edge and hingedly connected to each other along their opposite side edge; and clip means for releasably maintaining the corner connector panels in face-to-face engagement.

8. A rigid, collapsible light box as claimed in claim 6 wherein the means for hingedly connecting the light diffuser panel to the edge of each front side panel comprises a front panel having a number of side edges equal to the number of front side panels and a large opening into the interior of the light box, said front panel hingedly connected along its side edges to the edge of each front side panel remote from the rear side panel, and wherein the light diffusing panel mounted over said opening is fixedly attached about its perimeter to the front panel.

9. A rigid, collapsible light box as claimed in claim 6 wherein the means for mounting the light unit to the back panel comprises a mounting plate comprising:

a base plate removably attachable to the back panel having an opening aligned with the opening in the back panel sufficiently large for at least the lamp of the light unit to extend therethrough; and a holder releasably attachable to the light unit and mountable on the base plate.

10. A rigid, collapsible light box as claimed in claim 9 wherein the holder can be rotated on the base plate.

11. A rigid, collapsible light box comprising:

a generally rigid flat, horizontal back panel having a select number of generally straight side edges and an opening in which a light unit having a lamp can be mounted;

a generally rigid flat, trapezoidal rear side panel having generally horizontal top and bottom edges and two side edges hingedly connected at its top edge to each side edge of the back panel, said rear side panels extending downwardly and outwardly from the back panel, with adjacent rear side panels in edge-to-edge engagement;

a generally rigid flat, rectangular front side panel having generally horizontal top and bottom edges and generally vertical side edges, hingedly connected at its top edge to the bottom edge of each rear side panel, wherein adjacent front side panels are in edge-to-edge engagement;

a multiple-hinged corner connector connecting each pair of adjacent rear side panels or front side panels, each corner connector having two generally flat corner connector panels in face-to-face engagement, each corner connector panels being hingedly connected along its lower edge to one of the adjacent rear side panels, said corner connector panels being hingedly connected to each other along their lower edge;

means for releasably maintaining the corner connector panels in face-to-face engagement;

a generally horizontal front flange hingedly connected to the bottom edge of each front side panel and extending toward the opposite side of the light box, said front flanges being rigidly connected at their ends to form a continuous border inside the front side panels;

a light diffuser panel covering the opening into the light box between the front flanges and fixedly attached about its outer perimeter to the front flanges;

removable means for mounting the light unit to the back panel so that the lamp is disposed within the light box; and wherein said light box is collapsible to a generally stacked, two-layered structure, wherein the back panel, the rear side panels, and the means for mounting the light unit to the back panel form one layer and the front side panels, the front flange and the light diffuser panel form the second layer which is generally in face-to-face engagement with the first layer.

12. A rigid, collapsible light box as claimed in claim 11 wherein the back panel is hingedly connected to the rear side panels by a flexible covering which is attached to the interior surface of the back panel and rear side panels and is continuous across the juncture of the back panel and each rear side panel.

13. A rigid, collapsible light box as claimed in claim 11 wherein each rear side panel is hingedly connected to the front side panel by a flexible covering which is attached to the interior surface of the rear side panel and front side panel and is continuous across the juncture of the rear side panel and front side panel.

14. A rigid, collapsible light box as claimed in claim 11 wherein each side panel is hingedly connected to the front flange by a flexible covering which is attached to the interior surface of the front side panel and front flange and is continuous across the juncture of the front side panel and the front flange.

15. A rigid, collapsible light box as claimed in claim 11 wherein the rear side panels have a notch at a select position along each side edge, said notch having a length about the same as the length of a corner connector panel and a width about equal to the thickness of a corner connector panel and wherein the corner connector panels are hingedly connected to the rear side panels along the edge of the rear side panel defining the length of the notch.

16. A rigid, collapsible light box as claimed in claim 11 wherein the means for releasably maintaining the corner connector panels in face-to-face engagement comprises a generally C-shaped clip extending over adjacent edges of the corner connector panels for applying a force against each corner connector panel in a direction toward the other corner connector panel.

17. A rigid, collapsible light box as claimed in claim 11 wherein the removable means for mounting the light unit to the back panel comprises a mounting plate comprising:

a base plate removably attached to the back panel having an opening in alignment with the opening in the back panel and three threaded studs extending in a direction generally normal to the base plate and away from the back panel;

a holder comprising an annular base having three slots extending about the base in an arc of about 90°, a generally cylindrical side wall attached at one end to the inner edge of the base and means for removably attaching the light unit to the side wall; and wherein the holder is mounted on the base plate with the threaded studs extending through separate slots and nuts are threaded onto the studs which when tightened prevent movement of the holder relative to the base plate and when loosened allow rotational movement of the holder relative to the base plate.

18. A rigid, collapsible light box as claimed in claim 11 wherein the back panel further comprises at least one ventilation hole.

19. A rigid, collapsible light box as claimed in claim 11 wherein the light box comprises four front and rear side walls.

20. A rigid, collapsible light box as claimed in claim 19 wherein the light diffuser panel is generally rectangular.

21. A rigid, collapsible light box as claimed in claim 11 wherein the light box comprises eight front and rear side walls.

22. A rigid, collapsible light box as claimed in claim 21 wherein the front flanges form a generally circular opening into the interior of the light unit between the front flanges.

23. A rigid, collapsible pyramidal-shaped light box comprising:

a rigid rectangular back panel having an opening in which a light unit having a lamp can be mounted;

four rigid rear side panels, each hingedly connected to a side edge of the back panel;

four rigid front side panels, each hingedly connected to a rear side panel;

a rectangular light diffuser panel hingedly coupled to the front side panels;

means for mounting the light unit to the back panel with the lamp disposed within the interior of the light box; and wherein the light box is collapsible to a generally stacked, two-layered structure wherein the first layer comprises the back panel, rear side panels, and means for mounting the lighting unit to the back panel and the second layer comprises the front side panels and the light diffuser panel.

24. A rigid, collapsible light box comprising:

a rigid back panel having more than four side edges and wherein all of the side edges are of generally equal length and an opening in which a light unit having a lamp can be mounted;

a rigid rear side panel hingedly connected to each side edge of the back panel and in edge-to-edge abutment with adjacent rear side panels;

a rigid front side panel hingedly connected to each rear side panel and in edge-to-edge abutment with adjacent front side panels;

a rigid front flange hingedly connected to each front side panel and in edge-to-edge abutment with adjacent front side panels, said front flanges having a circular opening into the interior of the light box;

a generally circular light diffuser panel fixedly attached about its perimeter to the front flanges;

means for mounting the light unit to the back panel with the lamp disposed within the interior of the light box; and wherein the light box is collapsible to a generally stacked, two-layered structure wherein the first layer comprises the back panel, rear side panels, and means for mounting the lighting unit to the back panel and the second layer comprises the front side panels and the light diffuser panel.

25. A rigid, collapsible two-compartment light box comprising:

a pair of light housing units, each light housing unit comprising:

a rigid back panel having a select number of side edges and an opening in which a light unit having a lamp can be mounted;

a rigid rear side panel hingedly connected to each side edge of the back panel;

a rigid front side panel hingedly connected to each rear side panel;

a rigid front flange hingedly connected to three front side panels;

means for mounting the light unit to the back panel so that the lamp is disposed within the interior of the light housing unit;

wherein the light housing units are positioned so that the front side panels of each light housing not hingedly connected to a front flange unit are in face-to-face engagement with a front side panel of the other light housing unit and hingedly connected to each other along their bottom edges;

a light diffuser panel releasably attached about its perimeter to the front flanges; and wherein the light housing units are collapsible to a generally stacked, four-layered structure wherein the outer layers comprise the back panel, the rear side panels, and the means for mounting the lighting unit to the back panel of each light housing unit and the inner layers comprise the front side panels and the front flanges of each light housing unit.

* * * * *